United States Patent Office.

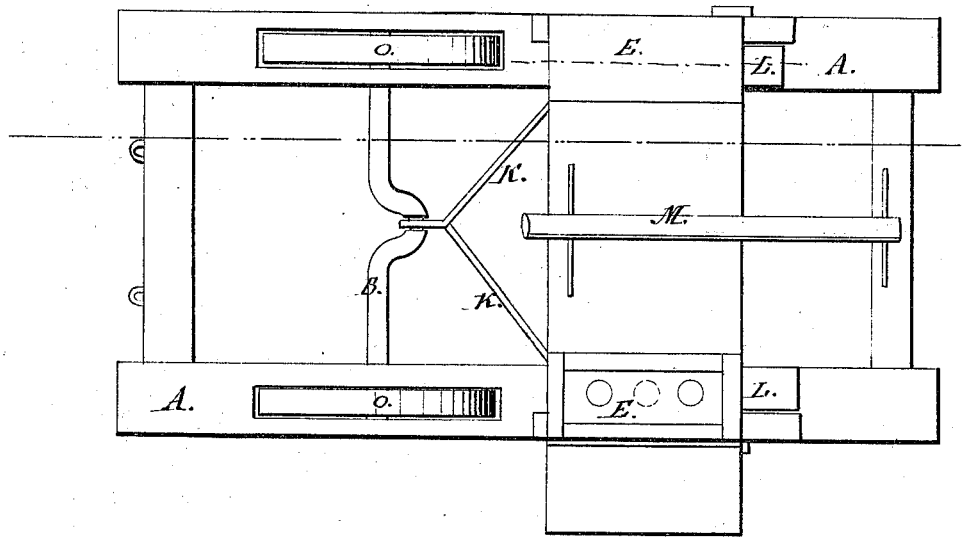
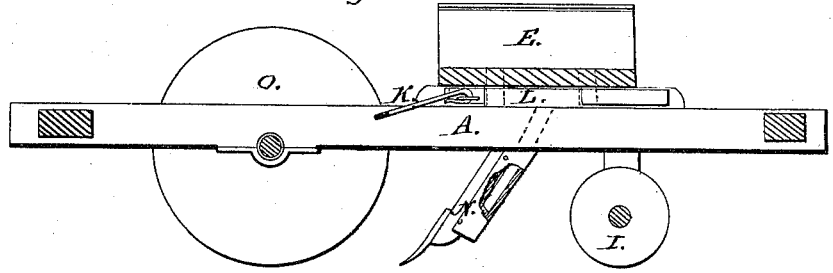
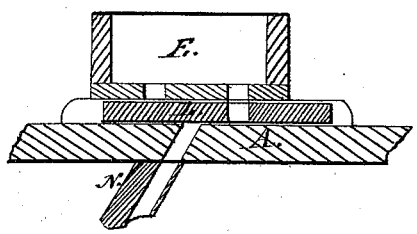

JOHN W. RICKETTS, OF CHARLESTON, ILLINOIS.

Letters Patent No. 97,229, dated November 23, 1869; antedated November 13, 1869.

IMPROVEMENT IN CORN-PLANTERS.

The Schedule referred to in these Letters Patent and making part of the same.

*To all whom it may concern:*

Be it known that I, JOHN W. RICKETTS, of Charleston, in the county of Coles, and in the State of Illinois, have invented certain new and useful Improvements in Corn-Planters; and do hereby declare that the following is a full, clear, and exact description thereof, reference being had to the accompanying drawings, and to the letters of reference marked thereon.

The object of my invention is to provide a corn-planter that will not only plant or drop the corn, but will, at the same time, make its own furrows, and then cover up the grain as rapidly as dropped, thus saving not only the trouble of furrowing, but of going over afterward to cover it up.

Figure 1 is a plan view of my planter.

Figure 2 is a section view of the same.

Figure 3 is a similar view of the seed-box.

Letter A represents the frame of my planter, which can be made of any shape and form desired.

The side pieces of this frame have a slot cut through them, so that the wheels pass up through and turn in them.

The axle B, upon which the driving-wheels turn, is shaped like a crank, near its middle, so as to operate the slides in the seed-boxes.

These driving-wheels are placed upon a direct line with the hoes, so as to make the furrows into which the corn drops.

Upon each side of the frame is placed a seed-box, E, which have two openings in their bottoms, so as to feed the corn to the slides L.

Each of these slides is joined to the crank on the axle B, by means of a rod, K; and by varying the size of this crank, the distance between the rows can be regulated at pleasure.

Underneath these boxes are placed the hoes or plows N, to the backs of which the tubes for conducting the corn are placed.

These, however, are not essential to the machine, but can be done entirely away with.

As the ground is already plowed or broken, and as it is intended that the driving-wheels O should make the furrows for the corn, and being placed on a direct line with the opening in the slides, the grain drops into them, without the use of the droppers.

Placed immediately behind the hoes, so as to run along over the furrows, and thus cover the corn, are placed the two rollers I, one upon each side of the frame.

As these rollers cover the corn as well as could be accomplished by hand, all the trouble of going over afterward is thus done away with.

As it is sometimes desirable to vary the weight, on different parts of the machine, an elongated seat, M, has been provided, so that the [driver can throw his weight upon either the driving-wheels, so as to deepen the furrows, or can throw it back upon the rollers, so as to the better cover the grains.

Having thus described my invention,

What I claim, and desire to secure by Letters Patent, is—

1. A corn-planter, arranged upon a frame, and supported upon driving-wheels O O, when said wheels are connected to a crank-axle, B, which forms the furrows by said wheels, and operates the dropping-mechanism, substantially as set forth.

2. The arrangement of the frame A, wheels O O, crank-axle B, bifurcated rod K, boxes E E, slides L L, shovels N, and rollers I, the several parts being constructed to operate substantially as specified.

In testimony that I claim the foregoing, I have hereunto set my hand, this 12th day of March, 1869.

JOHN W. RICKETTS.

Witnesses:
 GEO. W. DICKINSON,
 JEWELL DAVIS.